March 12, 1968     W. P. MYERS ET AL     3,372,896
PORTABLE TELEVISION RECEIVING SET SUPPORT
Filed May 31, 1966
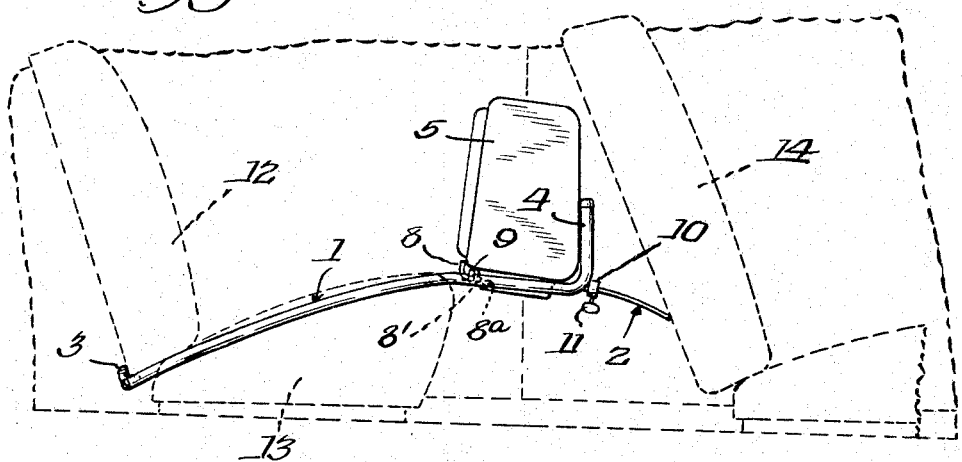
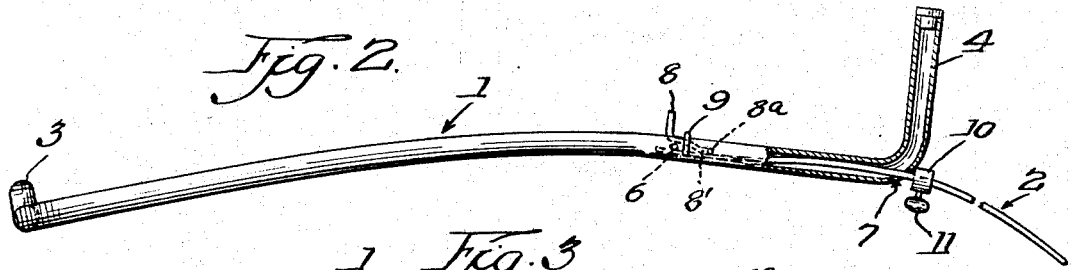
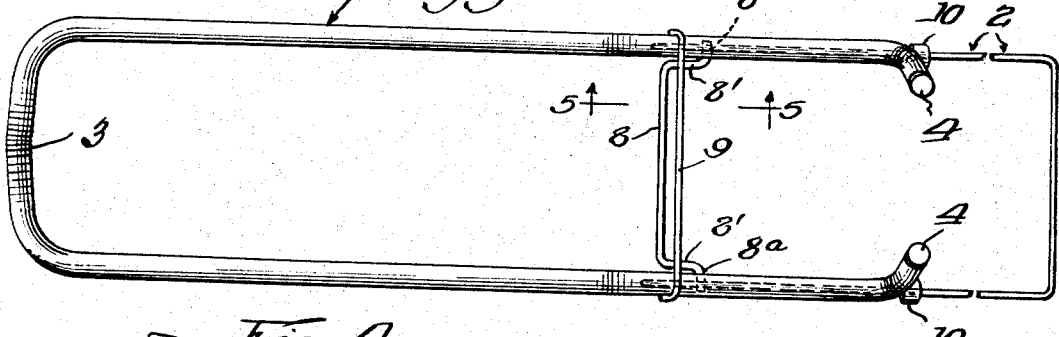
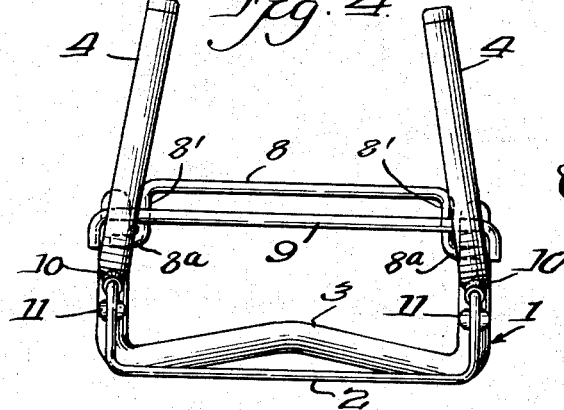
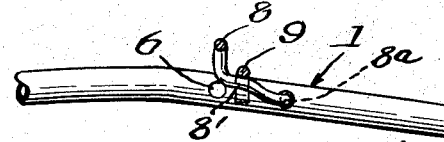
Inventors.
Walter P. Myers, &
Joseph J. Orloff
By W. F. Kellogg   Atty.

United States Patent Office 3,372,896
Patented Mar. 12, 1968

3,372,896
PORTABLE TELEVISION RECEIVING
SET SUPPORT
Walter P. Myers, River Forest, and Joseph J. Orlof,
Wheaton, Ill. (both of 2958 W. Carroll Ave., Chicago, Ill. 60612)
Filed May 31, 1966, Ser. No. 553,755
1 Claim. (Cl. 248—350)

ABSTRACT OF THE DISCLOSURE

A support advantageous for supporting television receiving sets within an auotmobile body having bowed and opposed telescopically interengaged relatively longitudinally adjustable U-shaped frames one of which has upstanding stops on its ends and a transversely disposed relatively inwardly spaced stop rod adjustably engageable over, with and along its opposite sides, and the other being constructed of material having a limited degree of flexibility.

The invention relates to improvements in supports for portable television receiving sets, more particularly to an automobile installable television receiving set support.

An important object of the invention is to provide a device of the stated character which is of such construction and design as will permit its satisfactory and secure placement within an automobile body between the rear seat and the back of the front seat of an automobile body (sedan, limousine, etc.) for receiving and supporting a portable televisionr eceiving set thereon in a position for picture viewing by occupants of the rear seat, this without need for alteration or modification of the seats or other portions of the body interior.

A further object of the invention is to provide a portable television set carrier or support capable of being conveniently and readily adjusted so as to be satisfactorily adaptable to and securely installed in the aforesaid types of automobile bodies wherein different spacing and/or arrangement occur as between the front and rear seats thereof.

Yet another object of the invention is to provide an automobile television receiving set support of such novel construction and form that with installation and the reception of a television set thereon, will respond automatically to increase the security and stability of such installation, yet when desired, may be readily removed.

It is also an object of the invention to provide a television receiving set support which is of durable, simple and economical construction, though of design which will, with installation, adapt to, if not augment the decor of the automobile body interior.

Yet another object of the invention is to provide a support for portable television receiving sets which, in use, will prevent shifting of the supported set longitudinally thereof, or its displacement therefrom, i.e., as when an equipped vehicle is abruptly accelerated or braked.

We are aware that heretofore carrier stands and supports for portable television receiving sets have been developed and used. For the better part, however, they have been found to be impractical for, or incapable of satisfactory installation and performance in automobile bodies; that in the lesser instances, they either require change to or modification of the body interior and so, are unacceptable to both the industry and the public.

Conversely, the carrier or support produced in accordance with our invention eliminates the above-stated disadvantages, being substantially universally adaptable to or installable in closed or open types of automobile bodies provided with different characters of seating or seating arrangements including design and relative spacing; moreover, being conveniently and readily removable, as and when desired, without damage to either the automobile body, or seating, or to the device.

Summary of the disclosure

Summarizing, the invention embraces a supporting body or frame including longitudinally opposed and paired substantially U-shaped frames the legs or sides of which are bowed. The substantially rigid legs or sides of one frame are tubular and slidably receive therein the flexible legs or sides of the remaining frame. Article engaging and retaining means are provided to the one frame, one of which consists of a rod whose end portions are angularly disposed and formed with outwardly disposed pintles optionally engageable in spaced and paired openings in the inner sides of the legs of said one frame. To prevent spreading of the one frame when stressed, as by the weight of an article received thereon, a second rod of length substantially corresponding to the width of the one frame having right angularly disposed fingers on its opposite ends is arranged over and parallel to the article engaging and retaining rod and welded or otherwise connected to its angularly disposed ends. The fingers are bindingly engageable over and with the adjacent portions of said one frame legs or sides.

The foregoing, as well as other objects, advantages and meritorious teachings of our invention will be in part obvious and in part pointed out in the following detailed disclosure thereof, when taken in conjunction with the accompanying drawings, it being understood that the form of the invention presented herein is precise and what is now considered to be the best mode of embodying its principles, but that other modifications and changes may be made in specific embodiments without departing from its essential features.

In the drawings:

FIGURE 1 is a side elevation of our television receiving set support showing it installed in an automobile between the back of the front seat and the back of the rear seat thereof, the automobile body and front and rear seats fragmentally shown in dotted lines.

FIGURE 2 is an enlarged side elevation of the support having its normally forward portion broken away and shown in section, plus the second or extendable frame section shown with portions of it broken away.

FIGURE 3 is a top view of the same.

FIGURE 4 is an end view thereof looking towards its normally rearward end; and

FIGURE 5 is a fragmentary detail in section taken on the line 5—5 of FIGURE 3, looking in the direction in which the arrows point.

Referring in detail to the drawings, our invention comprises a supporting frame including relatively opposed substantially U-shaped sections 1 and 2, the sides of the section 1 being bowed or curved upwardly and complemental, and those of section 2 being similarly formed and complemental, hence downwardly directed.

The section 1 is made of tubular material, preferably bent tubular metal, the basal and normally outer end of which is formed with an upwardly (or downwardly) disposed lip 3, while the inner end portions of its sides are correspondingly disposed upwardly (bent or otherwise effected), as at 4, to constitute stops or abutments for a received and supported portable television receiving set indicated by the numeral 5. Transversely opposed and paired openings 6 are formed in the inner sides of the tubular sides of the frame in suitably spaced relation to the stop or abutments 4, while openings or ways 7 are formed in those portions of each of the tubular frame sides adjacent the points of jointure or bending of said stops, the purpose of which will be presently described.

To secure the frame supported receiving set 5 against shifting movement longitudinally of the supporting frame, a stop bar or rod 8 of length substantially corresponding to the width of the frame is provided thereto. It comprises a body portion of suitable gauge formed with complemental right angularly shaped and disposed sides 8', each carrying outwardly disposed pintles 8ª optionally engageable in the aforesaid paired openings 6 in the frame sides. A second bar or rod 9, of similar gauge, is laid transversely of and over the sides 8', parallel to the rod and fixedly secured thereto, as by welding or other means, having downwardly (right angularly) disposed fingers 9' on its opposite ends. The length of the rod 9 substantially matches the width of the frame 1; in consequence, when engaged transversely thereof, as shown in the FIGURES 1 and 3, its fingers 9' bindingly or frictionally engage over and with the outer surfaces of the frame sides. Thereby, spreading of the frame, as by the weight of the receiving set 5 thereon will be prevented, assuring firm and stable support therefor.

The U-shaped section 2 is formed of spring wire, the gauge of which is such that it will have but a limited degree of flexibility and will be slidably enterable into the tubular sides of the frame section 1 by way of the openings 7 therein (see FIGURE 2). The lengths of the sides of the section may, of course, vary, though it is preferable that they shall be less than the lengths of the sides of the tubular section 1. As inferred, because the section 2 sides are slidably received in those of the section 1, the former is selectively longitudinally adjustable relative to the latter, and in order that it may be securely, though releasable, retained in a particularly adjusted position, stop collars 10 are slidably received on the sides thereof. Locking or set screws 11 are threadedly engaged in and through the collars adapted to be turned into binding or locking engagement with adjacent portions of said sides to lock the collars and hence, effect retention of the section 2 in the desired or required adjusted relation to the section 1, i.e., prevent its inward sliding movement.

The length of the supporting frame, as constituted by the sections 1 and 2, it will be understood, is such that with longitudinal adjustment and locking of the section 2 in an adjusted position, it will approximate (somewhat exceed) the distance between the back of a vehicle body front seat and the back of its back or rear seat, capable of engagement of its end provided with the basal lip 3 between the rear seat back 12 and seat cushion 13, in the manner shown in FIGURE 1 of the drawing. The intermediate portion of the section 1 lies on and transversely of the rear seat cushion for adequate support, with its forward portion, receiving and supporting the television receiving set 5, extended therebeyond, while the section 2 extends beyond the section 1 downwardly into binding engagement with a lower side portion of the back of the front seat 14. Because of the weight of the receiving set 5 and its application to the upwardly bowed or arcuate frame section 1, a limited spring flexing of the sides of the section 2 occurs, thus effecting positive and firm engagement of the outer end or basal portion thereof with the front seat back, ensuring support stability.

Where our improved support is used in vehicle bodies having greater or lesser distances between their front and rear seats than that above described, it is only necessary that the overall length of the support shall be accordingly varied by adjustment of the frame section 2 with relation to its tubular body section 1 in the hereinbefore described manner.

As and when desired, the support can be readily removed by loosening the stop collar locking screws 11 in order that the frame section 2 may be slid inwardly relative to the section 1, permitting the latter to be free and readily disengaged from between the rear seat back and cushion, all without damage or difficulty of any sort.

We claim:
1. A support of the character described, comprising;
 (a) a substantially U-shaped first frame upwardly curved throughout its length;
 (b) a substantially U-shaped second frame upwardly curved throughout its length having a limited degree of flexibility slidably engaged with the first frame and adjustable longitudinally toward and away therefrom;
 (c) the outer end and basal portion of the first frame being offset with relation to the sides thereof and the extremities of its opposite sides shaped to form abutments;
 (d) a transverse rod having its end portions angularly disposed and formed with outwardly disposed pintles selectively engageable in longitudinally spaced and opposed openings in the inner sides of the sides of said first frame, and,
 (e) a second transverse rod engaged over and with the angularly disposed end portions of the first mentioned rod having right angularly disposed fingers on its opposite ends bindingly engageable over and with the sides of the first frame.

References Cited

UNITED STATES PATENTS

| | | | |
|---|---|---|---|
| 1,754,219 | 4/1930 | Alexander | 248—356 |
| 2,510,244 | 6/1950 | Moltrup | 224—42.42 |
| 2,605,811 | 8/1952 | Zoranovich | 297—253 |
| 2,619,311 | 11/1952 | Feild | 248—149 |
| 2,744,667 | 5/1956 | Maloney | 224—42.42 X |
| 3,143,331 | 8/1964 | Corey | 248—356 |
| 3,262,736 | 7/1966 | Merelis | 297—253 |

ROY D. FRAZIER, *Primary Examiner.*

R. P. SEITTER, *Assistant Examiner.*